Sept. 7, 1954  J. B. STERLING  2,688,289
CARGO TIE-DOWN ASSEMBLY
Filed Feb. 8, 1952
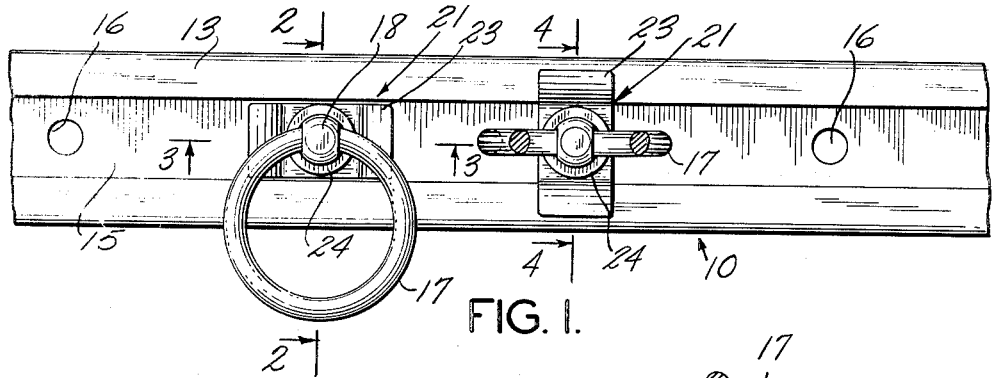
FIG. 1.
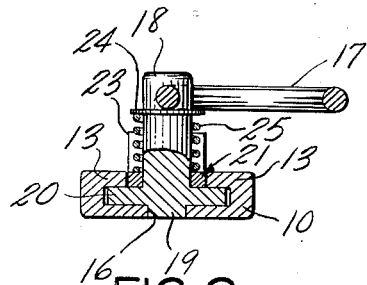
FIG. 2.
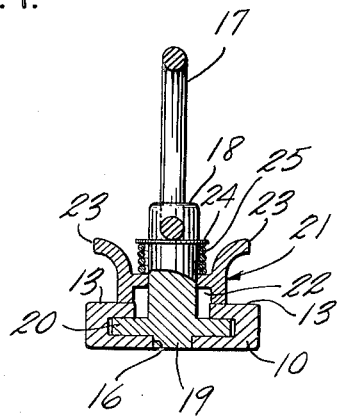
FIG. 4.
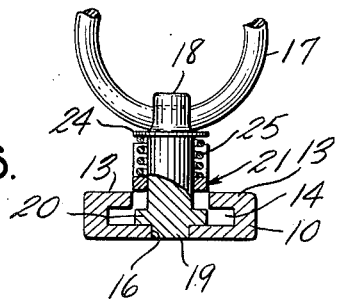
FIG. 6.
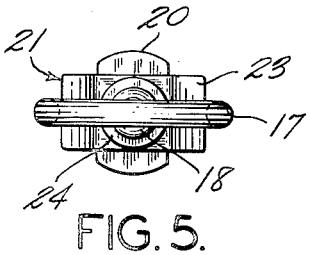
FIG. 5.
FIG. 3.
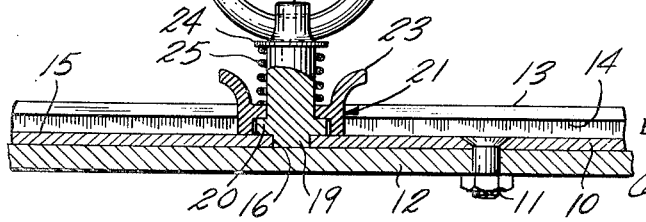
INVENTOR:
JAMES B. STERLING
BY
his ATTORNEYS Patented Sept. 7, 1954

2,688,289

UNITED STATES PATENT OFFICE 2,688,289

CARGO TIE-DOWN ASSEMBLY

James B. Sterling, Menlo Park, Calif., assignor to Pan American World Airways, Inc., New York, N. Y., a corporation of New York Application February 8, 1952, Serial No. 270,534

10 Claims. (Cl. 105—369)

This invention relates to cargo securing devices and has particular reference to a movable tie-down ring for securing cargo in the hold of aircraft, boats, trucks, railway cars, and the like.

It is common practice to provide the walls of cargo spaces with fixed rings or eyes through or to which ropes, bands or other cargo lashing members are passed or secured, but such fixed rings are frequently in the wrong place, cannot accommodate different sizes of crates, packages or the like, and often interfere with loading, unloading and placement of the cargo. The movable or removable rings or clips that have been attempted either are too insecure to be safe, too complicated for rapid removal and emplacement, or too expensive to warrant replacement of the fixed rings.

In accordance with the present invention, a cargo tie-down ring assembly is provided, which is inexpensive, simple and rapid to remove and emplace, and self-locking against accidental loosening or dislodgement under the most rigorous usage.

The cargo tie-down ring assembly comprises a channel-shaped rail having overhanging, inwardly-turned lateral flanges and adapted to be secured to the walls, floor or ceiling of the cargo hold and provided at spaced intervals with socket holes adapted to receive the centering stud of the pin to which the ring is attached and which carries a cross-bar fixed to the stud and adapted to pass through the slot defined by the overhanging lateral flanges of the rail and to lodge under these flanges when the pin is inserted in a socket hole in the rail and turned through a 90° angle. Rotatably mounted on the pin and having a width allowing it to pass through the slot in the rail is a spring-pressed retainer which drops into the rail slot and locks the cross-bar against dislodgment, and which must be retracted manually from locking engagement with the cross-bar to enable the latter to be released from the rail upon rotating the pin and bar through 90°.

It will be seen that the cargo tie-down ring assembly of this invention is simple in construction and operation, secure against dislodgement, and inexpensive to manufacture, being made of only six parts in addition to the rail which, being of simple C-shaped cross-section may be extruded metal, such as aluminum alloy or the like.

For a more complete understanding of the invention, reference may be had to the accompanying drawings, in which:

Figure 1 is a plan view of a channel secured to the wall of a cargo space and shows at the left-hand end thereof a cargo tie-down ring locked in place for cargo tie-down service and, at the right-hand end, a ring after the first step of removal thereof;

Fig. 2 is a transverse section through the left-hand or locked tie-down ring in locked position, as seen along the line 2—2 of Fig. 1;

Fig. 3 is a longitudinal section therethrough, as seen along the line 3—3 of Fig. 1;

Fig. 4 is a transverse section through the right-hand ring of Fig. 1, as seen along the line 4—4 thereof, showing the retainer in released position;

Fig. 5 is a plan view of the ring showing the relation of the parts when released from the rail; and Fig. 6 is a transverse section through a rail and ring assembly with the ring shown in the position of assembly or release with the rail at a selected point thereon.

Referring to the drawings, numeral 10 designates a rail 10 which is adapted to be secured as by bolts, one of which is shown in Fig. 3 and designated 11, to the wall, floor or ceiling 12 of the cargo hold. One or more of such rails 10 may be secured to each inner surface of the hold, preferably in the direction of normal movement of the cargo in loading and unloading so as to serve as friction-reducing guides for the cargo. Obviously, the rails 10 may be recessed flush with or formed in the surfaces of the walls, floor or ceiling, if desired.

Rail 10 is channel-shaped as shown in Figs. 2, 4 and 6, and the longitudinal upper edges thereof are provided with inwardly-turned lateral flanges 13 which overhang the channel 14 and which define the narrow longitudinal slot 15. The channel 14 and the slot 15 thus form an inverted T-shaped slot shown in Figs. 2, 4 and 6.

Spaced at convenient intervals along the center line of the rail 10 and piercing the bottom web thereof are socket holes 16 which locate the cargo tie-down ring at the selected point along the rail 10, as will now be described.

The ring 17 for receiving a hook, strap, rope or the like, for lashing or otherwise tieing the cargo in place in the hold, passes loosely through an eye in the upper end of a pin 18 forming the body of the device. The lower end of ring 17 terminates in a reduced stud 19 having a diameter slightly smaller than that of the socket holes 16 in rails 10 and an axial length slightly less than the axial length of the socket holes 16.

Formed integrally with or rigidly secured to pin 18 at the inner end of stud 19 is a cross-bar 20 having a thickness axially of pin 19 slightly less than the depth of channel 14, a length slightly less than the width of channel 14, and a width slightly less than the width of slot 15. Thus, the cross-bar 20 may be inserted through the rail slot 15 when aligned longitudinally therewith and with the stud 19 aligned axially with a hole 16, and turned with a pin 18 so that the ends of the bar 20 lodge under the overhanging rail flanges 13. As shown in Fig. 5, the ends of cross-bar 20 are curved about the center of pin 18 to enable the cross-bar 20 to clear the walls of channel 14 as the cross-bar is rotated.

Loosely mounted on pin 18 between the ring 17 and the cross-bar 20 is a retainer 21, which is roughly H-shaped in appearance as shown in Fig. 3, and has a width slightly less than the width of the rail slot 15 so as to fit between the flanges 13, i. e., the retainer 21 has about the same width as the cross-bar 20, so that when they are aligned as in Fig. 6 they may be simultaneously inserted into the rail slot 15.

The groove 22 extending across the lower surface of the cleat 21 is wide enough to accommodate the cross-bar 20 when the latter is turned crosswise with the retainer 21, as shown in Figs. 3 and 5. The upstanding ears 23 serve as means for readily grasping the retainer 21 between thumb and finger, and are best shown in Fig. 3.

Encircling the pin 18 between the outer surface of retainer 21 and a washer or collar 24 abutting the ring 17 is a coil spring 25, which normally urges the retainer 21 downwardly or toward and against the cross-bar 20.

In operation of the cargo tie-down ring assembly of this invention, the cargo hold is fitted with the rails 10 for the reception of the tie-down ring 17 and its carrying pin 18 fitted with the the aforementioned locking parts 19 to 25. The user selects the point at which the ring 17 is required in the rail 10 and with the retainer 21 turned on pin 18 so that it is in longitudinal alignment with cross-bar 20 as is shown in Fig. 6, inserts the assembly into the rail slot 15 so that the stud 19 lodges in the socket hole 16 that is nearest to the selected point. As is shown in Fig. 6, in this position retainer 21 is prevented by the rail flanges 13 from turning, but ring 17, pin 18 and cross-bar 20 are free to turn.

The used then turns ring 17 through 90°, and with it pin 18 and cross-bar 20, so that the latter lies crosswise of the rail with its ends lodged under the overhanging rail flanges 13. In this 90° position, cross-bar 20 is also aligned with bottom slot 22 in retainer cleat 21, whereupon spring 25 forces retainer 21 inwardly or downwardly further into rail slot 15 so that the cross-bar 20 lodges in bottom cross-groove 22, as shown in Figs. 2 and 3. The snapping sound made by the lodgment of the retainer 21 into locking engagement with the cross-bar 20 informs the user that the ring is locked to the rail against unintended dislodgment and is ready for use. Any desired number of ring units may be similarly emplaced along cooperating opposite or adjacent rails 10 to secure the cargo.

In order to release the locked tie-down ring, retainer 21 is lifted in the rail slot 15 against the pressure of the spring 25 a sufficient distance to clear the cross-bar 20. With the retainer 21 held in this retracted position the ring 17, pin 18, and its cross-bar 20 are simultaneously rotated through 90° to align the latter with the rail slot 15. The cargo tie-down ring and its appurtenant parts can then be freely lifted out of the rail slot 15 for removal to another location on the rail or to another rail, depending on the position of the cargo to be lashed in the hold. The cargo tie-down ring upon removal is ready without further manipulation to be installed in another location on the rail or on another rail. The cargo tie-down ring assembly can easily be removed from the rail with one hand, for example, by lifting the retainer 21 by grasping ears 23 with the thumb and forefinger, and simultaneously turning the ring 17 with the second finger of the same hand.

Alternatively, the number of turns of spring 25 may be reduced, or the pin 18 lengthened so that retainer 21 may be raised clear out of rail slot 15 against the pressure of the spring 25 and turned on the pin 18 through 90° so as to span the slot 15 and rest on the rail flanges 13, as shown in Fig. 4. Then by turning the ring 17, pin 18 and its cross-bar 20 through 90° to align the latter with the rail slot 15, the spring 25 snaps the pin and its cross-bar 20 out of the rail slot 15 for removal to another location as aforementioned. When the retainer 21 is released in this fashion and the ring unit removed from the rail, the parts are in the position shown in Fig. 5, with the cross-bar 20 lying at an angle of 90° to the retainer 21. To place the ring unit in condition for reinsertion in the rail slot 15, it is first necessary to lift retainer 21 away from the cross-bar 20 against the pressure of spring 25 and then turn the retainer 21 through 90° about pin 18 so that it lies in longitudinal alignment with cross-bar 20, as previously described and shown in Fig. 6.

Although a preferred embodiment of the invention has been illustrated and described herein, it is to be understood that the invention is not limited thereby, but is susceptible of changes in form and detail within the scope of the appended claims.

I claim:

1. In combination with a rail secured to a wall or other surface and having a relatively wide elongated channel behind a relatively narrow surface slot defined by spaced lateral flanges and forming an inverted T-shaped passage, a pin adapted to be inserted through said slot, an enlarged head on one end of said pin adapted to lodge in the channel behind at least one of said flanges, a retainer movable axially on said pin, detent means on said retainer and head adapted to engage for locking said head in said channel behind said flange upon axial movement of said retainer toward said head to engage said detent means, and fastening means connected to the other end of said pin.

2. In combination with a rail secured to a wall or other surface and having a relatively wide elongated channel behind a relatively narrow surface slot defined by spaced lateral flanges and forming an inverted T-shaped passage, a pin adapted to be inserted through said slot, an enlarged head on one end of said pin adapted to lodge in the channel behind at least one of said flanges, a retainer movable axially on said pin and having a width slightly less than the width of said slot, detent means on said retainer and head adapted to engage for locking said head in said channel behind said flange upon axial movement of said retainer in said slot toward said head to engage said detent means, and fastening means connected to the other end of said pin.

3. In combination with a rail secured to a wall or other surface and having a relatively wide elongated channel behind a relatively narrow surface slot defined by spaced lateral flanges and forming an inverted T-shaped passage, a pin adapted to be inserted through said slot, an enlarged head on one end of said pin adapted to lodge in the channel behind at least one of said flanges and having a narrow portion of less radius than the radius of said head portion lodged behind said flange, a retainer movable axially on said pin and having a width slightly less than the width of said slot, an abutment on said retainer adapted to engage the narrow portion of said head for locking said head in said channel behind said flange upon axial movement of said retainer in said slot toward said head to engage said abutment and narrow head portion, and fastening means connected to the other end of said pin.

4. In combination with a rail secured to a wall or other surface and having a relatively wide elongated channel behind a relatively narrow surface slot defined by spaced lateral flanges and forming an inverted T-shaped passage, a pin adapted to be inserted through said slot, an elongated head on one end of said pin and having a length slightly less than the width of said channel and adapted to lodge in the channel behind at least one of said flanges and having a width less than the width of said slot, a retainer movable axially on said pin, abutments on the ends of said retainer forming a narrow groove on its lower surface having a width slightly greater than the narrow width of said head for locking said head in said channel behind said flange upon axial movement of said retainer toward said head to seat said head in said retainer groove, and fastening means on the other end of said pin.

5. In combination with a rail secured to a wall or other surface and having a relatively wide elongated channel behind a relatively narrow surface slot defined by spaced lateral flanges and forming an inverted T-shaped passage having a socket hole in its inner surface opposite said slot, a pin adapted to be inserted through said slot, an enlarged head on one end of said pin adapted to lodge in the channel behind at least one of said flanges, a stud projecting from the lower surface of said head and adapted to be inserted in the said socket hole, a retainer movable axially on said pin, detent means on said retainer and head adapted to engage for locking said head in said channel behind said flange upon axial movement of said retainer toward said head to engage said detent means, and fastening means connected to the other end of said pin.

6. In combination with a rail secured to a wall or other surface and having a relatively wide elongated channel behind a relatively narrow surface slot defined by spaced lateral flanges and forming an inverted T-shaped passage, a pin adapted to be inserted through said slot, an enlarged head on one end of said pin adapted to lodge in the channel behind at least one of said flanges, a retainer movable axially on said pin, detent means on said retainer and head adapted to engage for locking said head in said channel behind said flange upon axial movement of said retainer toward said head to engage said detent means, resilient means normally urging said retainer toward said head, and fastening means connected to the other end of said pin.

7. A fastening device for cooperative use with a rail secured to a wall or other surface and provided with a relatively wide elongated channel behind a relatively narrow surface slot defined by spaced lateral flanges and forming an inverted T-shaped passage, comprising a pin adapted to be inserted through said slot, an enlarged head on said pin adapted to lodge in the channel behind at least one of said flanges and having a narrow portion of less radius than the radius of said head portion lodged behind said flange, a retainer movable axially on said pin, an abutment on said retainer adapted to engage the narrow portion of said head for locking said head in said channel behind said flange upon axial movement of said retainer toward said head to engage said abutment and narrow head portion, resilient means normally urging said retainer toward said head, and fastening means connected to the other end of said pin.

8. A fastening device for cooperative use with a rail secured to a wall or other surface and provided with a relatively wide elongated channel behind a relatively narrow surface slot defined by spaced lateral flanges and forming an inverted T-shaped passage having a socket hole in its inner surface opposite said slot comprising a pin adapted to be inserted through said slot, an enlarged head on one end of said pin having a long dimension adapted to lodge in the channel behind at least one of said flanges and a narrow dimension adapted to pass through said slot, a stud projecting from the lower surface of said head and adapted to be inserted in the said socket hole, a retainer movable axially on said pin, abutments at the ends of said retainer adapted to span the narrow dimension of said head for locking said head in said channel behind said flange upon axial movement of said retainer toward said head to span the narrow dimension of said head, and fastening means connected to the end of said pin opposite the stud end thereof.

9. A fastening device for cooperative use with a rail secured to a wall or other surface and provided with a relatively wide elongated channel behind a narrower slot defined by spaced lateral flanges and forming an inverted T-shaped passage having longitudinally spaced socket holes in its inner surface opposite said slot comprising a pin adapted to be inserted at one end through said slot and into one of said socket holes, an elongated cross-bar secured to the pin at a point spaced from said end thereof and having a width less than the width of said slot and a length slightly less than the width of the channel for rotation therein about the axis of the pin to a locked position lodging the ends of the cross-bar under said lateral flanges, a retainer rotatably mounted on said pin between said cross-bar and said ring having a cross-groove on its under surface of a width slightly greater than the width of said cross-bar to receive the same when aligned therewith and thereby hold the cross-bar in said locked position, said retainer also having a width less than the width of said slot to hold the retainer against rotation in said slot, resilient means interposed between said ring and retainer to urge the latter toward said cross-bar for engagement therewith when said pin is rotated in said slot to align the cross-bar with the retainer cross-groove, and fastening means connected to the end of said pin opposite the said one end thereof.

10. In combination with a rail secured to a wall or other surface and having a relatively wide elongated channel behind a relatively narrow surface slot defined by spaced lateral flanges and forming an inverted T-shaped passage having a socket hole in its inner surface opposite said slot, a pin adapted to be inserted through said slot and into said socket hole, an enlarged head on said pin adapted to lodge in the channel behind at least one of said flanges, a retainer movable axially on said pin, detent means on said retainer adapted to engage in the rail slot for locking said head in said channel behind said flange upon axial movement of said retainer toward said rail to engage said detent means in said rail slot, and fastening means connected to the other end of said pin.

No references cited.